(12) United States Patent
Aylsworth

(10) Patent No.: US 10,814,519 B2
(45) Date of Patent: Oct. 27, 2020

(54) SCANNING SYSTEMS FOR LUMBER RETRIEVAL EQUIPMENT

(71) Applicant: Steven L. Aylsworth, Chatfield, MN (US)

(72) Inventor: Steven L. Aylsworth, Chatfield, MN (US)

(73) Assignee: ACER Inc., Rushford, MN (US)

(*) Notice: Subject to any disclaimer, the term of this patent is extended or adjusted under 35 U.S.C. 154(b) by 502 days.

(21) Appl. No.: 15/645,318

(22) Filed: Jul. 10, 2017

(65) Prior Publication Data

US 2017/0305029 A1    Oct. 26, 2017

Related U.S. Application Data

(60) Continuation-in-part of application No. 15/486,228, filed on Apr. 12, 2017, now Pat. No. 10,525,587,
(Continued)

(51) Int. Cl.
*B27B 31/00* (2006.01)
*B25J 9/02* (2006.01)
(Continued)

(52) U.S. Cl.
CPC ............... *B27B 31/00* (2013.01); *B23Q 7/04* (2013.01); *B25J 9/023* (2013.01); *B25J 15/00* (2013.01);
(Continued)

(58) Field of Classification Search
CPC ........ B23D 59/008; B23Q 7/04; B23Q 7/042; B23Q 2240/007; B25J 19/02;
(Continued)

(56) References Cited

U.S. PATENT DOCUMENTS 561,715 A    6/1896    Lynch
2,730,144 A    1/1956    Joa
(Continued)

FOREIGN PATENT DOCUMENTS

DE    2501012 A1    7/1976
DE    4317767 A1    12/1994
(Continued)

OTHER PUBLICATIONS

SBC; SBC Magazine; 33 pages; Madison, WI; Sep. 2008.
(Continued)

*Primary Examiner* — Saul Rodriguez
*Assistant Examiner* — Brendan P Tighe
(74) *Attorney, Agent, or Firm* — bobharter.com; Robert J. Harter

(57) ABSTRACT

Automated lumber handling systems include one or more lumber-scanning sensors that travel independently of a board-carrying trolley to reduce board retrieval times and increase scanning accuracy and resolution. In some examples, the lumber handling systems retrieve various size boards from a series of spaced-apart stations, and deliver chosen boards in a certain sequence to a saw. The saw then cuts the boards to sizes suitable for making prefabricated roof trusses and/or wall frames.

13 Claims, 6 Drawing Sheets

Related U.S. Application Data which is a continuation-in-part of application No. 15/350,041, filed on Nov. 12, 2016, now Pat. No. 10,239,224, which is a continuation-in-part of application No. 15/331,824, filed on Oct. 22, 2016, now Pat. No. 10,421,209, which is a continuation-in-part of application No. 14/577,779, filed on Dec. 19, 2014, now Pat. No. 10,280,006, which is a division of application No. 13/136,922, filed on Aug. 15, 2011, now Pat. No. 8,960,244.

(60) Provisional application No. 61/402,654, filed on Sep. 2, 2010, provisional application No. 62/361,073, filed on Jul. 12, 2016.

(51) Int. Cl.
| | | |
|---|---|---|
| *B23Q 7/04* | (2006.01) | |
| *B65G 59/00* | (2006.01) | |
| *B25J 15/00* | (2006.01) | |
| *B25J 19/02* | (2006.01) | |

(52) U.S. Cl.
CPC ............ *B25J 19/022* (2013.01); *B65G 59/00* (2013.01); *B23Q 2240/007* (2013.01)

(58) Field of Classification Search
CPC ...... B25J 19/021; B25J 19/022; B25J 19/023; B27B 31/00; B27B 31/02; B65G 1/0428; B65G 1/0442; B65G 47/901; B65G 47/91; B65G 47/912; B65G 47/92; B65G 57/18; B65G 59/00; B65G 59/02; B65G 59/023; B65G 59/026; B65G 59/04; B65G 59/045; B65G 2201/0217; G01B 11/00; G01B 11/24; G01B 11/2433
USPC ........... 144/245.5, 245.7; 356/601, 602, 603, 356/604, 605, 606, 607, 608, 609, 610, 356/611, 612, 613; 414/222.01, 795.4, 414/796.5, 796.9, 797; 700/167
See application file for complete search history.

(56) References Cited

U.S. PATENT DOCUMENTS

| | | |
|---|---|---|
| 3,116,835 A | 1/1964 | Brandon |
| 3,254,764 A | 7/1966 | Boyle |
| 3,272,044 A | 9/1966 | Obenshain |
| 3,873,000 A | 3/1975 | Eaton et al. |
| 3,894,625 A | 7/1975 | Boyle et al. |
| 3,952,883 A | 4/1976 | Phillips |
| 4,185,672 A | 1/1980 | Vit et al. |
| 4,560,456 A | 12/1985 | Heil et al. |
| 4,610,360 A | 9/1986 | Forslund |
| 4,640,655 A | 2/1987 | Jacobsen |
| 4,838,748 A | 6/1989 | Johnson |
| 5,096,090 A | 3/1992 | Schwartz et al. |
| 5,249,915 A | 10/1993 | Ritola |
| 5,806,868 A | 9/1998 | Collins |
| 5,879,129 A | 3/1999 | Newnes et al. |
| 5,893,468 A | 4/1999 | Holmes |
| 5,899,659 A | 5/1999 | Beilsmith |
| 6,065,927 A | 5/2000 | Baron et al. |
| 6,379,105 B1 | 4/2002 | Aylsworth |
| 6,923,614 B2 | 8/2005 | Aylsworth |
| 7,736,120 B2 | 6/2010 | Pierson et al. |
| 7,746,481 B2 | 6/2010 | Kranz et al. |
| 7,950,316 B2 | 5/2011 | Koskovich |
| 8,348,287 B1 | 1/2013 | Smith |
| 2003/0006586 A1 | 1/2003 | Comilla |
| 2011/0265311 A1* | 11/2011 | Kondo ............... B25J 9/0084 29/559 |

FOREIGN PATENT DOCUMENTS

| | | |
|---|---|---|
| DE | 19617818 A1 | 11/1997 |
| FR | 2673923 A1 | 9/1992 |
| FR | 2675493 A1 | 10/1992 |

OTHER PUBLICATIONS

Stiles, Weinmann Robotic Saw System and Material Handling Portal, sales advertisement in SBC magazine; 1 page; Madison, WI; published Sep. 2008.
Miser; Automated Wood Processing System; Koskovich brochure; 5 pgs.; Rochester, MN; copyright 2007.
Omni; Automated Lumber Processing System; CAD drawings; 2 pgs.; published 2008 or earlier.
Wood Truss Systems; 2006 Weinmann WBZ 100 Linear Saw; sales advertisement; 2 pgs., equipment itself in publich domain in 2006 or earlier.
Handling Portal WHP; Weinmann sales specs.; one page; published 2008 or earlier.
Stiles; Weinmann Robotic Saw System; sales literature and equipment specs; 6 pages; equipment itself in public domain in 2006 or earlier.

\* cited by examiner

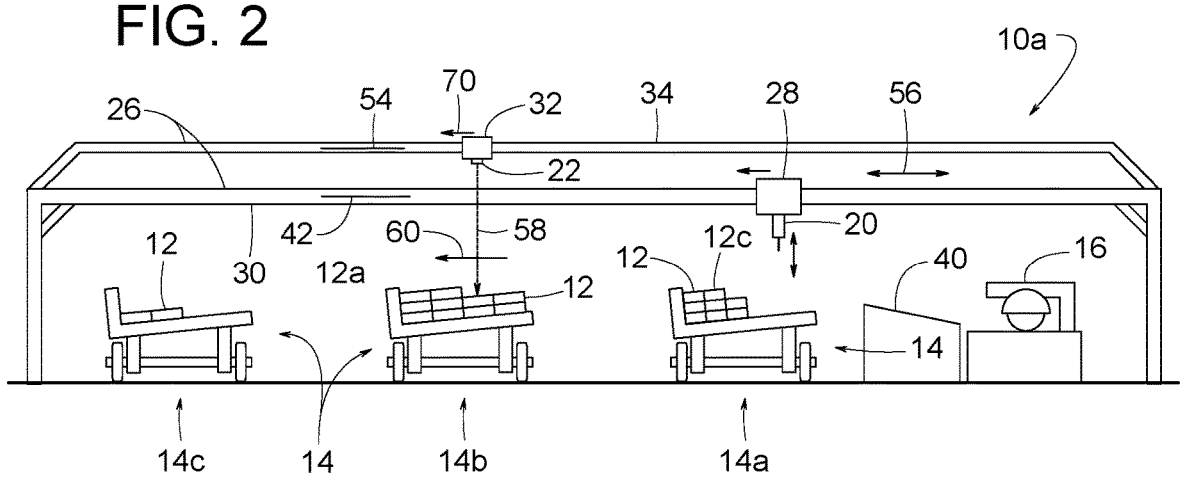
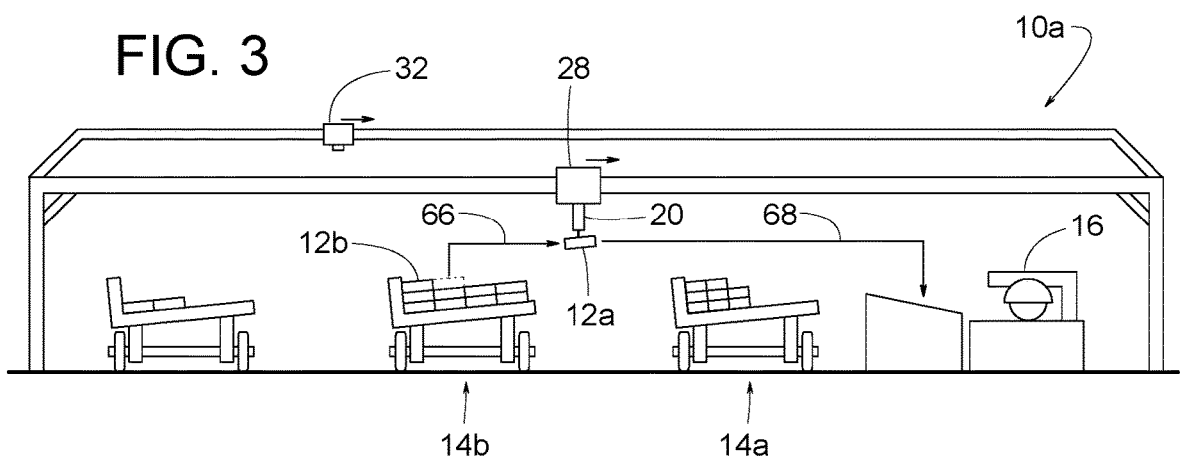
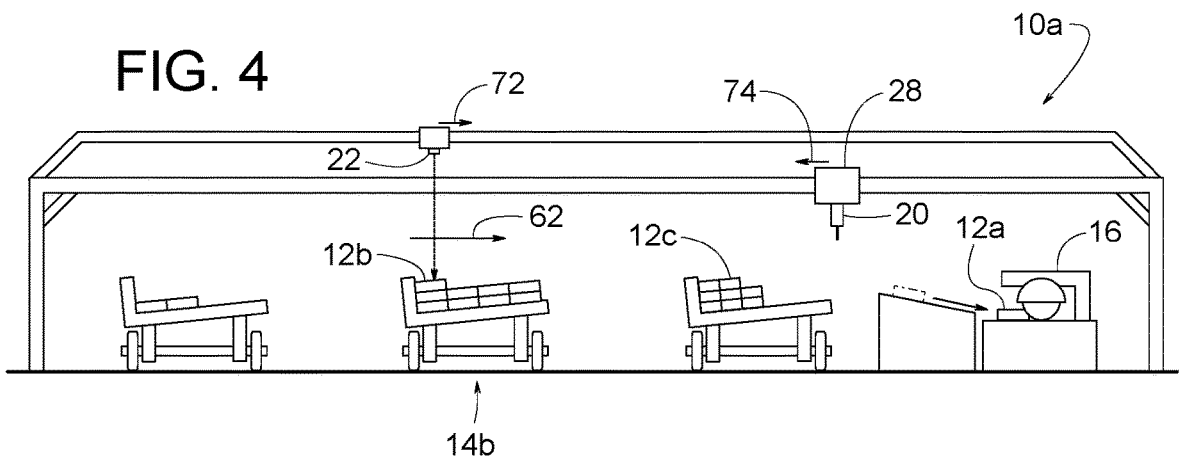

SCANNING SYSTEMS FOR LUMBER RETRIEVAL EQUIPMENT

CROSS REFERENCE TO RELATED APPLICATIONS

This present application is a continuation-in-part of U.S. patent application Ser. No. 15/486,228 filed on Apr. 12, 2017; which is a continuation-in-part of U.S. patent application Ser. No. 15/350,041 filed on Nov. 12, 2016; which is a continuation-in-part of U.S. patent application Ser. No. 15/331,824 filed on Oct. 22, 2016; which is a continuation-in-part of U.S. patent application Ser. No. 14/577,779 filed on Dec. 19, 2014; which is a division of U.S. patent application Ser. No. 13/136,922 filed on Aug. 15, 2011 now U.S. Pat. No. 8,960,244; which claims priority to provisional patent application No. 61/402,654 filed on Sep. 2, 2010. This present application also claims priority to provisional patent application No. 62/361,073 filed on Jul. 12, 2016. Each of the aforementioned applications and U.S. Pat. No. 8,960,244 are specifically incorporated herein by reference.

FIELD OF THE DISCLOSURE

The subject invention generally pertains to material handling and more specifically to board scanning and board handling of lumber retrieval systems.

BACKGROUND

Various machines and methods have been developed for retrieving individual pieces of lumber or boards stacked at one location and feeding the boards individually to a saw. Examples of such systems are disclosed in U.S. Pat. Nos. 6,379,105 and 6,923,614; each of which are specifically incorporated herein by reference. Additional lumber handling systems are disclosed in U.S. Pat. Nos. 2,730,144; 3,873,000 and 3,952,883; each of which are specifically incorporated herein by reference. A lumber processing system for making prefabricated trusses and panels is disclosed in U.S. Pat. No. 7,950,316; which is specifically incorporated herein by reference.

BRIEF DESCRIPTION OF THE DRAWINGS

FIG. 2 is a right side view of the lumber retrieval system shown in FIG. 1 illustrating an example method of using the system.

FIG. 3 is a right side view similar to FIG. 2 but showing another stage of the method.

FIG. 4 is a right side view similar to FIGS. 2 and 3 but showing another stage of the method.

DETAILED DESCRIPTION

Figure 1:
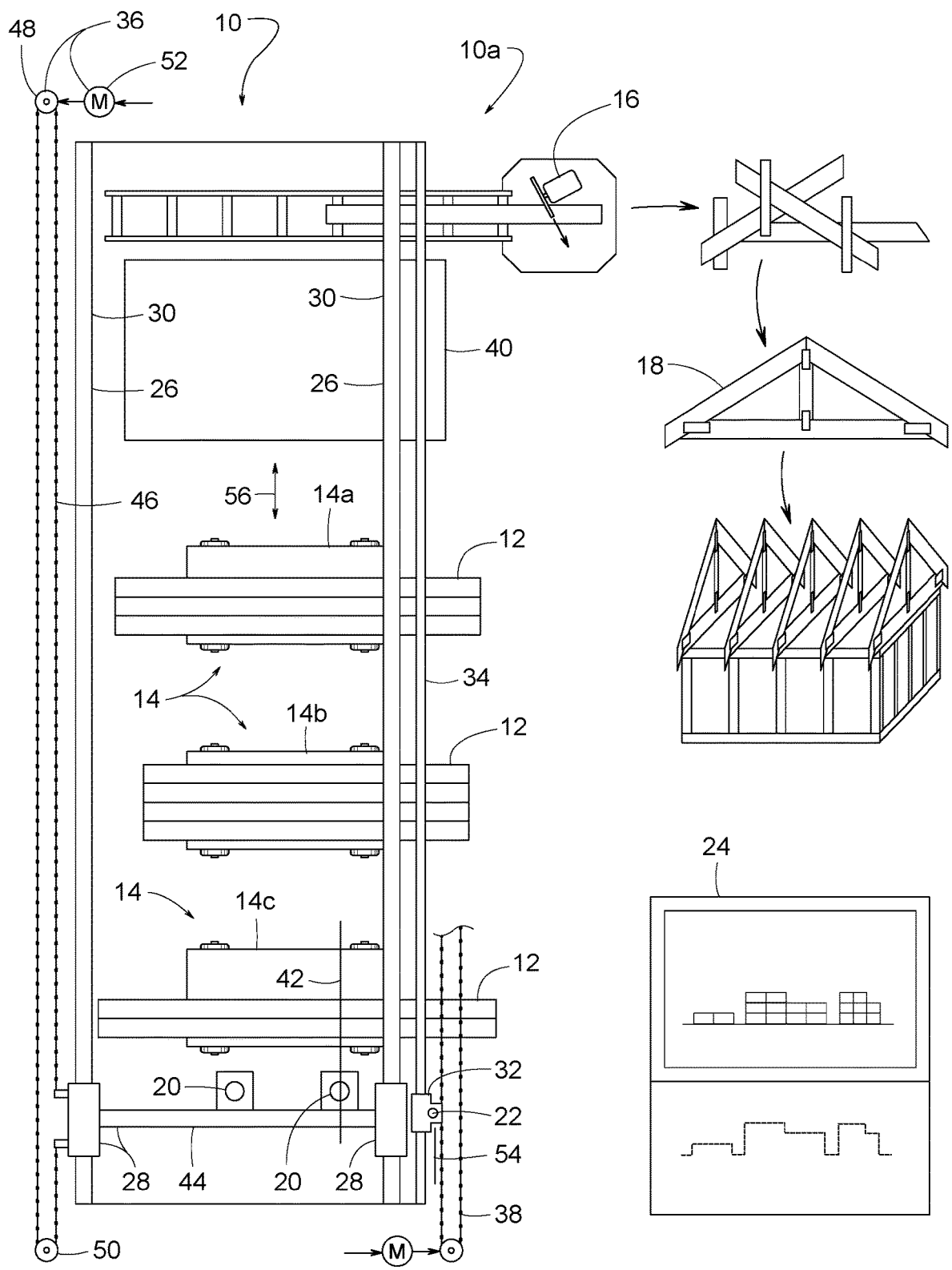
FIG. 1 is a top view schematic diagram of an example lumber retrieval system and method for automatically scanning and retrieving boards from a plurality of stations of stacked lumber, wherein the system and method is in accordance with the teachings disclosed herein.

FIGS. 1-11 illustrate various examples of a lumber retrieval system 10 (e.g., lumber retrieval systems 10*a* and 10*b*) and some methods associated with them. More specifically, FIGS. 1-7 illustrate lumber retrieval system 10*a*, and FIGS. 8-11 illustrate lumber retrieval system 10*b*. Lumber retrieval system 10 provides means for laser scanning a plurality of boards 12 at a plurality of stations 14, selecting and picking desired boards in a certain sequence, and transferring the chosen boards to a saw 16. Saw 16 then cuts the boards to various predetermined lengths suitable for creating prefabricated roof trusses 18 or wall framework. The vertical extension and retraction of an example board picker 20 and other details of lumber retrieval system 10 are disclosed in U.S. Pat. No. 8,960,244 and patent application Ser. Nos. 15/331,824 and 15/486,228 all of which are specifically incorporated herein by reference.

To reduce the board processing time and thus increase the throughput of lumber retrieval system 10, current examples of system 10 (system 10*a* and 10*b*) include a board sensor 22 and board picker 20 that can travel independently of each other. This allows carefully controlled scanning of boards 12 while, at the same time, board picker 20 is delivering or retrieving boards.

In the particular example illustrated in FIGS. 1-7, lumber retrieval system 10*a* and its associated method involves the use of an electronic controller 24, a frame system 26 (e.g., gantry, overhead bridge structure, overhead framework, one or more tracks, etc.), a trolley 28 that carries board picker 20 along a first track 30 (rail, beam, etc.) of frame system 26, a carrier 32 (e.g., a trolley) that carries sensor 22 along a second track 34 (rail, beam, etc.) of frame system 26, a trolley drive unit 36 for moving trolley 28 along track 30, a carrier drive unit 38, saw 16, a board-receiving structure 40 (e.g., ramp, conveyor, chute, etc.) for passing boards to saw 16, and stations 14 (e.g., a first station 14*a*, a second station 14*b*, a third station 14*c*, etc.) for holding boards 12 of various sizes.

The term, "station" refers to any designated area for supporting one or more stacks of lumber. A station could include a single stack of lumber of the same size boards, a single stack of lumber of different size boards, multiple spaced-apart stacks of lumber comprising boards of equal size or of different sizes, and a plurality of boards of an assortment of sizes mixed together or divided and organized in a magazine. Examples of a station include, but are not limited to, a cart, a pallet, a magazine, a shelf, floor, etc. The term, "plurality of stations" means that there are multiple stations each having a stack of lumber, wherein the stacks of lumber are spaced apart from each other.

Board picker 20 is schematically illustrated to represent any apparatus capable of lifting a board 12 up from a stack of lumber at a station 14. Examples of board picker 20 include, but are not limited to, one or more piercing tools, one or more suction cups, one or more hooks, one or more grippers, etc. In the illustrated examples, board picker 20 is carried by trolley 28, which travels along a first path 42 guided by first track 26. In some examples, trolley 28 actually comprises a beam 44 supported by a pair of trolleys 20. In some examples, beam 44 supports two or more board pickers 20, as shown in FIG. 1.

In the illustrated example, trolley drive unit 36 moves trolley 28 along the length of first track 30. In some examples, drive unit 36 comprises a cogged belt 46 supported between a drive cogged wheel 48 and an idler cogged wheel 50 with opposite ends of belt 46 being attached directly or indirectly to trolley 28. Drive wheel 48 is driven by a motor 52 under the command of controller 24. In some examples, motor 52 is a model AM3042-1G00-000 servomotor by Beckhoff of Verl, Germany. In some examples, carrier drive unit 38 operates in a similar manner or in a functionally equivalent way to move carrier 32 along a second path 54 guided by second track 34. Other examples of trolley drive unit 36 and/or carrier drive unit 38 include, but are not limited to, a pneumatic cylinder, hydraulic cylinder, rodless cylinder, linear motor, drive screw, rack-and-pinion mechanism, etc.

In some examples, tracks 30 and 34 are parallel and spaced apart to provide trolley 28 and carrier 32 with non-interfering, overlapping travel in a direction 56 that is generally perpendicular to the length of boards 12 and passes over stations 14. For instance, in some examples, first track 30 determines first path 42 for board picker 20, and second track 34 determines second path 54 for sensor 22, wherein paths 42 and 54 are spaced apart and substantially parallel to each other. To prevent carrier 32 and sensor 22 from obstructing the transfer of a board 12 picked up and carried by board picker 20, some examples have carrier 32 and sensor 22 traveling at a higher elevation than that of trolley 28 and board picker 20.

Electronic controller 24 is schematically illustrated to represent any electrical system that provides output signals in response to input signals. The input signals come from various lumber retrieval system devices (e.g., sensor 22, encoder associated with trolley drive unit 36, various limit switches, manual switches, etc.). The output signals from controller 24 determine the operation of various lumber retrieval system components (e.g., motor 52 of trolley drive unit 36, board picker 20, carrier drive unit 38, saw 16, etc.). Examples of controller 24 include, but are not limited to, a single computer, a system of multiple computers, a single PLC (programmable logic controller), a system of multiple PLCs, various combinations of one or more computers and PLCs, and various combinations of computers, PLCs, sensors, laser units, switches, touchscreens, relays, etc. A specific example of controller 24 is a model CP6201-0001-0200 industrial computer by Beckhoff of Verl, Germany.

Sensor 22 is schematically illustrated to represent any touch-free sensor for detecting the presence and location of boards 12. The term, "touch-free" means that sensor 22 is in scanning relationship with the lumber, so sensor 22 scans the lumber without having to physically touch it. In some examples, sensor 22 is a laser unit that emits a laser beam 58 for sensing a vertical distance between a surface and the laser emitting device. An example of a laser version of sensor 22 includes, but is not limited to, a model RF603-260/1250-232-I-IN-AL-CC-3 laser triangulation position sensor provided by Riftek of Minsk, One example operating sequence of lumber delivery system 10 is shown in FIGS. 2-7. In this example, controller 24 determines that an orderly assembly of truss 18 means that saw 16 will need sequentially a first board 12a from second station 14b, a second board 12b from station 14b, and then a third board 14c from first station 14a. To avoid wasting time scanning every station 14, controller 24 commands sensor 22 to scan only second station 14b, as second station 14b will be the first one providing a board. So, FIG. 2 shows sensor 22 making a first-pass scan 60 of second station 14b to determine the location of a first board 12a to be picked. At the same time, trolley 28 moves board picker 20 toward second station 14b in preparation to pick up first board 12a.

FIG. 3 shows carrier 32 having moved to a neutral location after having scanned second station 14b. FIG. 3 also shows board picker 20 engaged with first board 12a as trolley 28 carries first board 12a from second station 14b, over first station 14a, and toward saw 16.

FIG. 4 shows sensor 22 making a second-pass scan 62 over second station 14b to determine the location of a second board 12b to be picked. At the same time, trolley 28 again moves board picker 20 toward second station 14b in preparation to pick up second board 12b.

Figure 5:
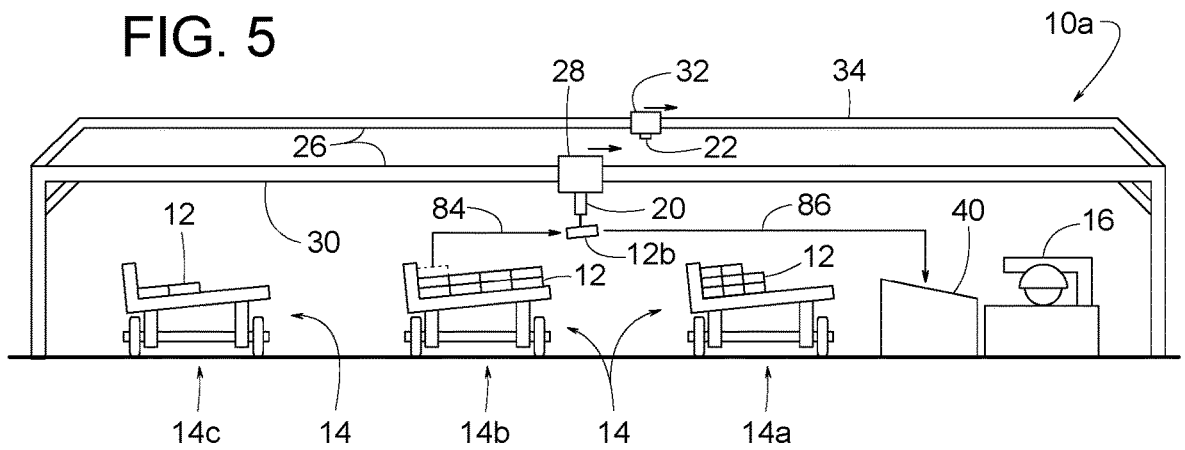
FIG. 5 is a right side view similar to FIGS. 2-4 but showing another stage of the method.

FIG. 5 shows carrier 32 having moved to another location after having scanned second station 14b for a second time. In this case, carrier 32 moves toward first station 14a, as that is the next station needing to be scanned. FIG. 5 also shows board picker 20 engaged with second board 12b as trolley 28 carries second board 12b from second station 14b, over first station 14a, and toward saw 16.

Figure 6:
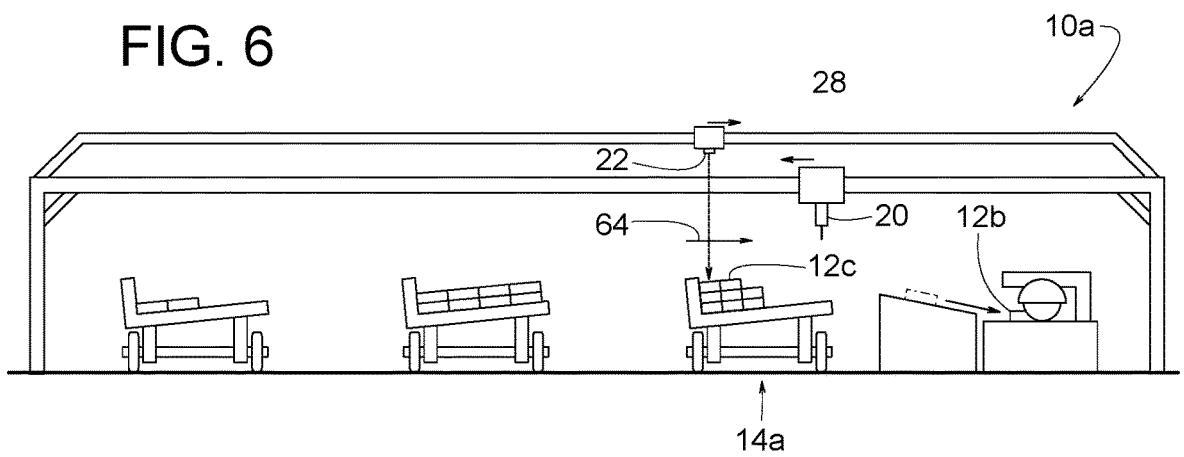
FIG. 6 is a right side view similar to FIGS. 2-5 but showing another stage of the method.

FIG. 6 shows sensor 22 making a first-time scan 64 over first station 14a to determine the location of a third board 12c to be picked. At the same time, trolley 28 moves board picker 20 toward first station 14a in preparation to pick up third board 12c.

Figure 7:
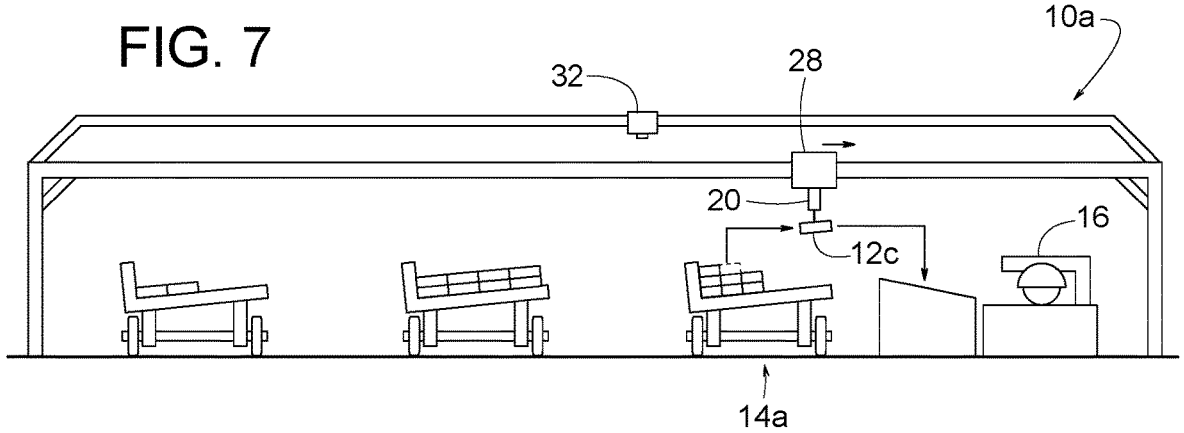
FIG. 7 is a right side view similar to FIGS. 2-6 but showing another stage of the method.

FIG. 7 shows carrier 32 having moved to another location after having scanned first station 14a. FIG. 7 also shows board picker 20 engaged with third board 12c as trolley 28 carries third board 12c from first station 14a toward saw 16.

Figure 8:
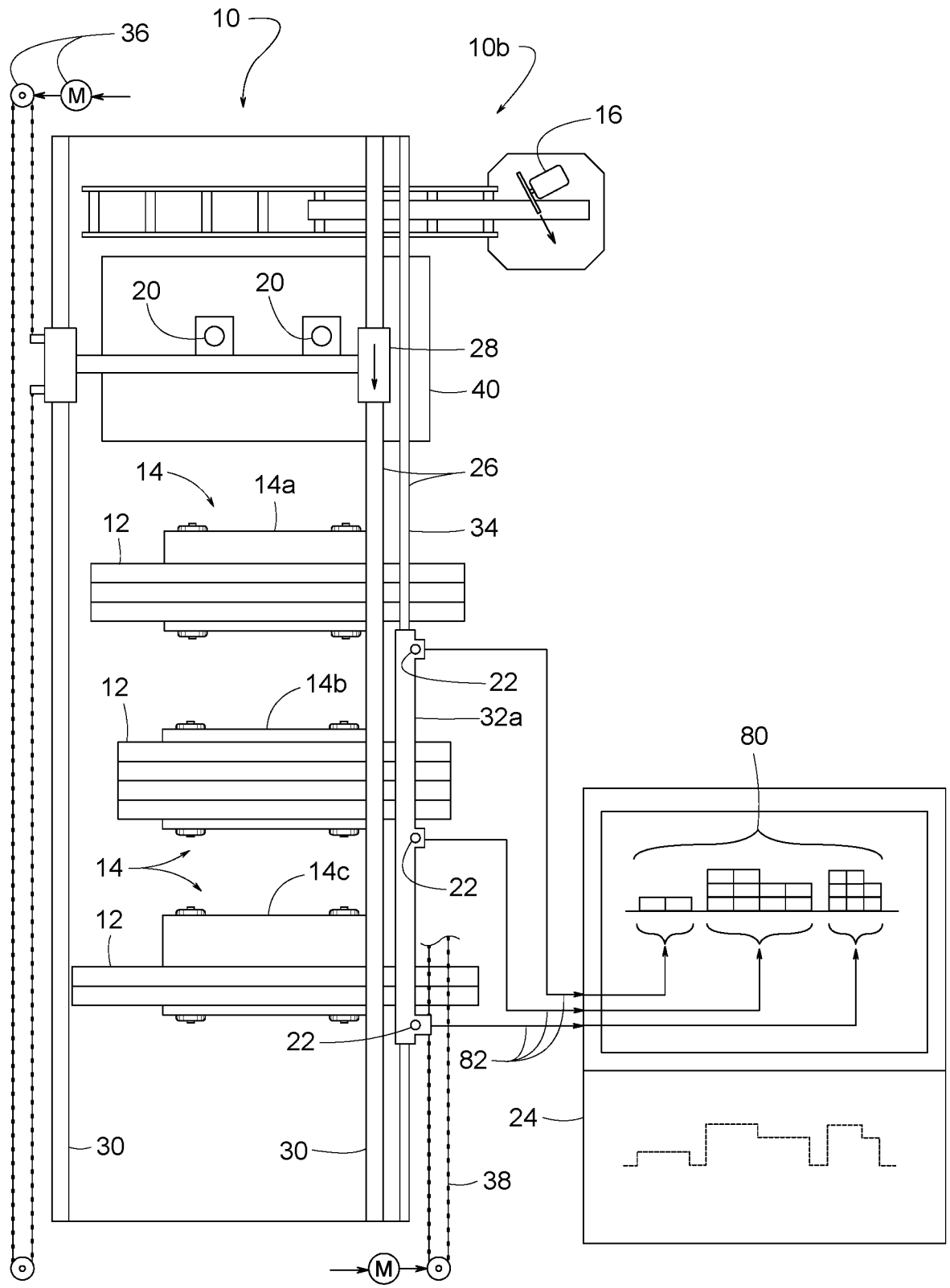
FIG. 8 is a top view schematic diagram of another example lumber retrieval system and method for automatically scanning and retrieving boards from a plurality of stations of stacked lumber, wherein the system and method is in accordance with the teachings disclosed herein.
Figure 9:
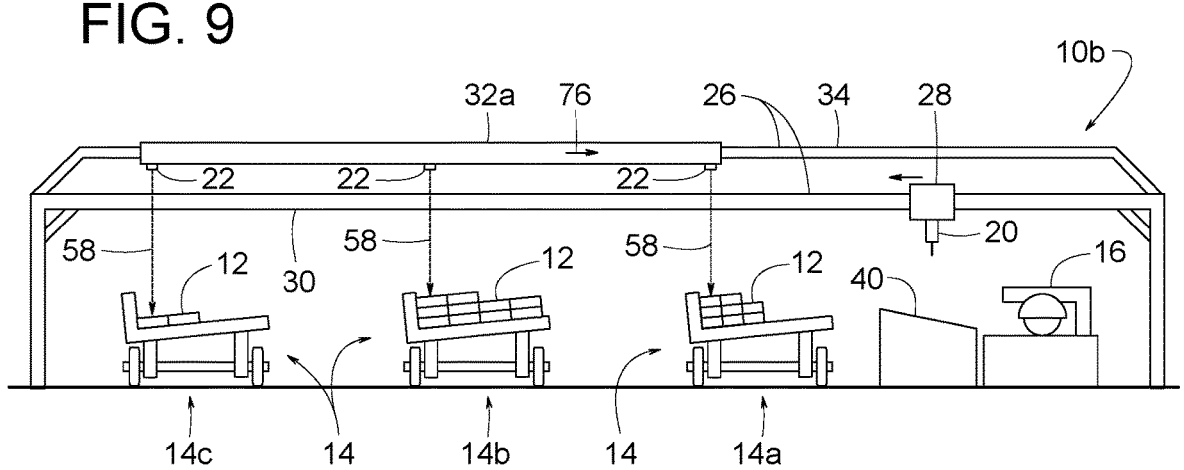
FIG. 9 is a right side view of the lumber retrieval system shown in FIG. 8 illustrating an example method of using the system.
Figure 10:
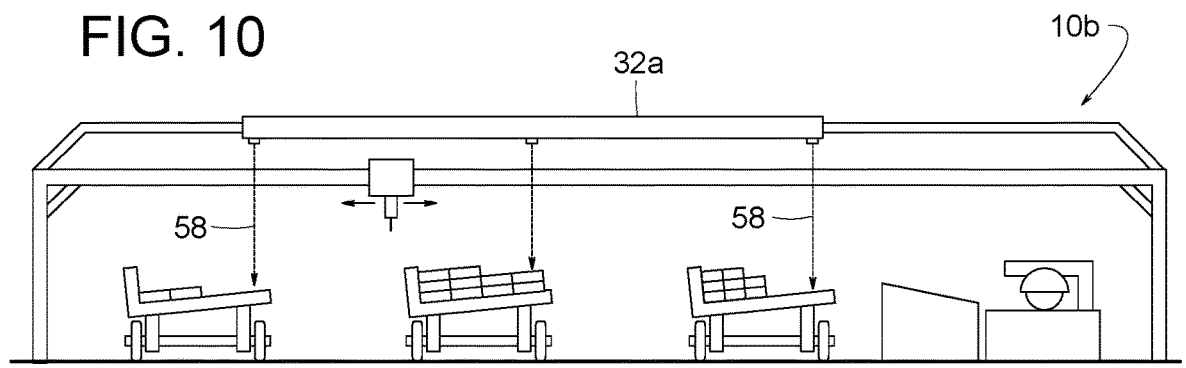
FIG. 10 is a right side view similar to FIG. 9 but showing another stage of the method.
Figure 11:
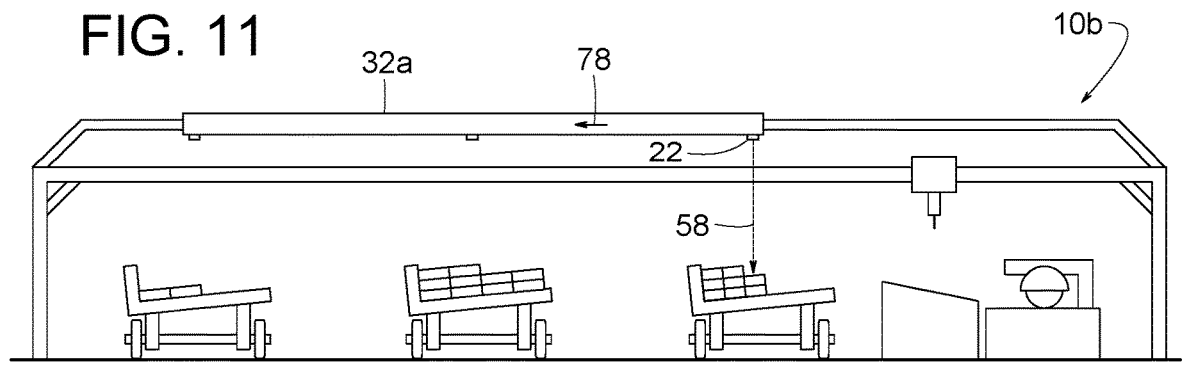
FIG. 11 is a right side view similar to FIGS. 9 and 10 but showing another stage of the method.

Referring to FIGS. 8-11, to further reduce the board processing time and thus increase the throughput of lumber retrieval system 10, board retrieval system 10b includes a plurality of board sensors 22 (one for each station 14) mounted to a single extra long carrier 32a. Carrier 32a and board picker 20 can travel independently of each other. This allows carefully controlled scanning of boards 12 while, at the same time, board picker 20 is delivering or retrieving boards. With three sensors 22, as shown in the illustrated example, no single sensor 22 has to travel over the full span of all three stations 14. Less travel distance means less time spent on scanning. Moreover, in some examples, all three sensors 22 scan concurrently, as shown in FIGS. 9 and 10. Alternatively, in some examples, only one sensor 22 is actively scanning a station from which the net board will be picked, as shown in FIG. 11.

Figure 12:
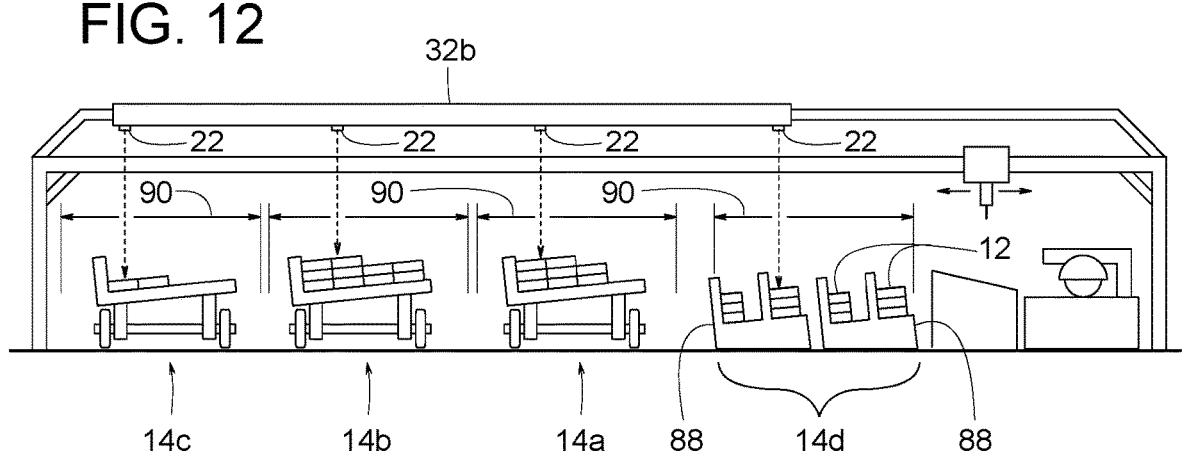
FIG. 12 is a right side view similar to FIGS. 9-11 but showing another example lumber retrieval system and method for automatically scanning and retrieving boards from a plurality of stations of stacked lumber, wherein the system and method is in accordance with the teachings disclosed herein.

FIG. 12 shows an example with one sensor 22 scanning a station 14d that comprises two magazines 88 holding an assortment of boards 12. This example also shows additional sensors 22 each scanning separate stations 14a-c. In this example, all four sensors 22 are mounted to an extra long carrier 32*b*, so they all move in unison. Arrows 90 show the travel range of each sensor 22.

Figure 13:
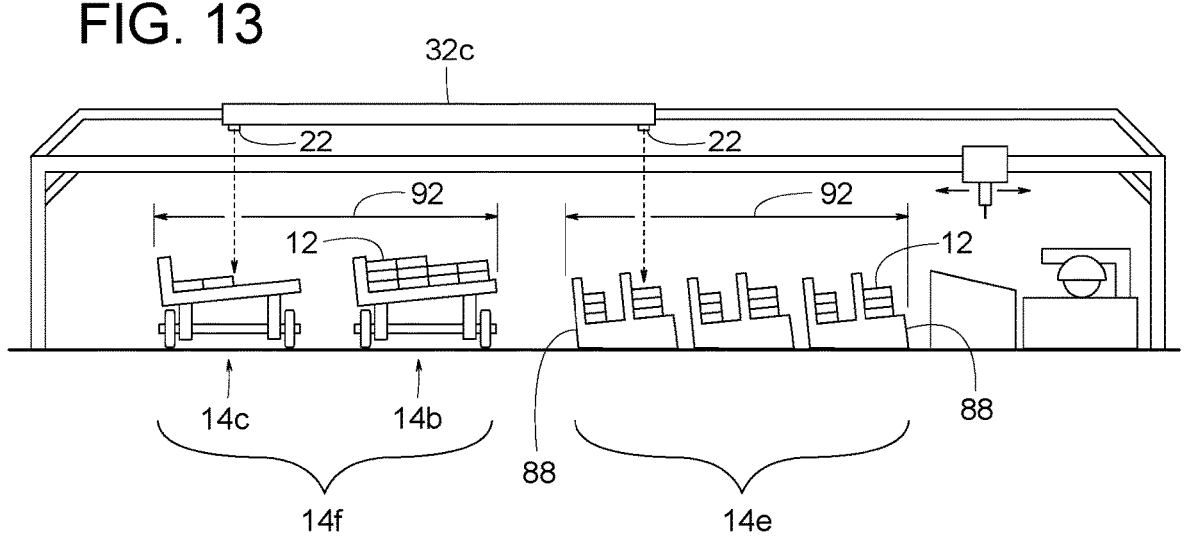
FIG. 13 is a right side view similar to FIGS. 9-12 but showing yet another example lumber retrieval system and method for automatically scanning and retrieving boards from a plurality of stations of stacked lumber, wherein the system and method is in accordance with the teachings disclosed herein.

FIG. 13 shows an example with one sensor 22 scanning a station 14*e* that comprises three magazines 88 holding an assortment of boards 12. This example also shows an additional sensor 22 scanning a station 14*f* that comprises two smaller stations 14*b* and 14*c*. In this example, the two sensors 22 are mounted to an extra long carrier 32*c*, so they both move in unison. Arrows 92 show the travel range of each sensor 22.

In at least some of the illustrated examples, arrows 66 and 68 represent trolley 28 carrying board 12 over the plurality of stations 14 toward saw 16; arrow 70 represents carrier 32 carrying sensor 22 over at least one station of the plurality of stations 14; arrow 60 represents sensor 22 scanning the plurality of boards 12 while carrier 32 is carrying sensor 22 over at least one station 14; and arrows 72 and 74 represents carrier 32 and trolley 28 traveling independently of each other such that sometimes carrier 32 travels slower than trolley 28, wherein the carrier's slower speed increases scanning accuracy and sampling resolution, and the trolley's higher speed reduces cycle time. FIGS. 8-11 shows an example where sensor 22 is one of a plurality of sensors 82, and arrows 76 and 78 show the sensors moving in unison with each other such that each sensor 22 travels over a different station of the plurality of stations 14. FIG. 8 shows electronic controller 24 generating a composite profile image 80 based on a plurality of readings 82 from the plurality of sensors 22, wherein the composite profile image 80 represents the plurality of boards 12 at the plurality of stations 14. Arrows 72 and 74 of FIG. 4 show trolley 28 and carrier 72 sometimes traveling in opposite directions to increase throughput. FIG. 3 shows carrier 32 sometimes traveling faster than trolley 28, as carrier 32 rushes to the next desired station to save time, while trolley 28 is burdened by board 12*a*.

In at least some of the illustrated examples, arrow 70 represents sensor 22 making first-pass scan 60 over second station 14*b*; arrows 66 and 68 represent trolley 28 carrying first board 12*a* from second station 14*b*, over first station 14*a* and toward saw 16 after sensor 22 makes first-pass scan 60 over second station 14*b*; arrow 72 represents sensor 22 making second-pass scan 62 over second station 14*b* prior to trolley 28 carrying second board 12*b* from second station 14*b*, over first station 14*a*, and toward saw 16; arrows 84 and 86 represent trolley 28 carrying second board 12*b* from second station 14*b*, over first station 14*a*, and toward saw 16 after sensor 22 makes second-pass scan 62 over second station 14*b*; and arrow 64 represents sensor 22 scanning the plurality of boards 12 at first station 14*a* after sensor 22 makes first-pass scan 60 and the second-pass scan 62 over second station 14*b*.

Although certain example methods, apparatus and articles of manufacture have been described herein, the scope of the coverage of this patent application is not limited thereto. On the contrary, this patent application covers all methods, apparatus and articles of manufacture fairly falling within the scope of the appended claims either literally or under the doctrine of equivalents.

The invention claimed is:

1. A lumber retrieval method of using a trolley for retrieving a board from a plurality of boards of various sizes from a plurality of stations and transferring the board toward a saw, the lumber retrieval method further using a sensor mounted to a carrier, the lumber retrieval method comprising:

the trolley carrying the board over the plurality of stations toward the saw;

the carrier carrying the sensor over at least one station of the plurality of stations;

the sensor scanning the plurality of boards while the carrier is carrying the sensor over the at least one station; and the carrier and the trolley traveling independently of each other such that sometimes the carrier travels slower than the trolley.

2. The lumber retrieval method of claim 1, wherein the sensor is one of a plurality of sensors that move in unison with each other such that each sensor of the plurality of sensors travels over different stations of the plurality of stations.

3. The lumber retrieval method of claim 2, further comprising an electronic controller generating a composite profile image based on a plurality of readings from the plurality of sensors, wherein the composite profile image represents the plurality of boards at the plurality of stations.

4. The lumber retrieval method of claim 1, wherein the trolley and the carrier sometimes travel in opposite directions.

5. The lumber retrieval method of claim 1, wherein the carrier sometimes travels faster than the trolley.

6. The lumber retrieval method of claim 1, wherein the plurality of stations include a first station and a second station, the saw being closer to the first station than to the second station, the plurality of boards includes a first board and a second board, and the lumber retrieval method further comprising:

the sensor making a first-pass scan over the second station;

the trolley carrying the first board from the second station, over the first station and toward the saw after the sensor makes the first-pass scan over the second station;

the sensor making a second-pass scan over the second station prior to the trolley carrying the second board from the second station, over the first station, and toward the saw;

the trolley carrying the second board from the second station, over the first station, and toward the saw after the sensor makes the second-pass scan over the second station; and the sensor scanning the plurality of boards at the first station after the sensor makes the first-pass scan and the second-pass scan over the second station.

7. The lumber retrieval method of claim 1, wherein the carrier and the trolley travel substantially parallel to each other.

8. The lumber retrieval method of claim 1, wherein the sensor is at a higher elevation than that of the trolley.

9. A lumber retrieval method of using a trolley for retrieving a board from a plurality of boards from a first station and a second station and for transferring the board toward a saw, the plurality of boards including a first board of a first size, a second board of the first size, and a third board of a second size, the lumber retrieval method further using a sensor mounted to a carrier, the lumber retrieval method comprising:

the sensor making a first-pass scan over the second station;

the trolley carrying the first board from the second station, over the first station and toward the saw after the sensor makes the first-pass scan over the second station;

the sensor making a second-pass scan over the second station prior to the trolley carrying the second board from the second station, over the first station, and toward the saw;

the trolley carrying the second board from the second station, over the first station, and toward the saw after the sensor makes the second-pass scan over the second station;

the sensor scanning the plurality of boards at the first station after the sensor makes the first-pass scan and the second-pass scan over the second station; and the trolley carrying the third board from the first station toward the saw after the sensor scans the plurality of boards at the first station.

10. The lumber retrieval method of claim 9, wherein the trolley and the carrier sometimes travel in opposite directions.

11. The lumber retrieval method of claim 9, wherein the carrier sometimes travels faster than the trolley.

12. The lumber retrieval method of claim 9, wherein the carrier and the trolley travel substantially parallel to each other.

13. The lumber retrieval method of claim 9, wherein the sensor is at a higher elevation than that of the trolley.

* * * * *